(12) United States Patent
Tähkiö et al.

(10) Patent No.: US 10,137,460 B2
(45) Date of Patent: Nov. 27, 2018

(54) DRIVE MODULE AND ITS USES, A FLOTATION PLANT AND A METHOD OF CHANGING OF THE DRIVE MODULE

(71) Applicant: OUTOTEC (FINLAND) OY, Espoo (FI)

(72) Inventors: Pekka Tähkiö, Espoo (FI); Valtteri Vaarna, Helsinki (FI); Matti Luukkonen, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/571,891

(22) PCT Filed: May 13, 2015

(86) PCT No.: PCT/FI2015/050325
§ 371 (c)(1),
(2) Date: Nov. 6, 2017

(87) PCT Pub. No.: WO2016/181022
PCT Pub. Date: Nov. 17, 2016

(65) Prior Publication Data
US 2018/0141055 A1    May 24, 2018

(51) Int. Cl.
*B03D 1/14*    (2006.01)
*B03D 1/02*    (2006.01)
(Continued)

(52) U.S. Cl.
CPC .............. *B03D 1/028* (2013.01); *B03D 1/14* (2013.01); *B03D 1/1406* (2013.01);
(Continued)

(58) Field of Classification Search
USPC ......................................... 209/168, 169, 170
See application file for complete search history.

(56) References Cited

U.S. PATENT DOCUMENTS

| | | |
|---|---|---|
| 4,992,669 A | 2/1991 | Parmley |
| 5,907,970 A | 6/1999 | Havlovick et al. |

FOREIGN PATENT DOCUMENTS

| | | | |
|---|---|---|---|
| DE | 1964332 A | * | 11/1978 |
| DE | 3229881 A | * | 2/1984 |

(Continued)

OTHER PUBLICATIONS

International Search Report issued by the Finnish Patent and Registration Office acting as the International Searching Authority in relation to International Patent Application No. PCT/FI2015/050325 dated Sep. 4, 2015 (5 pages).

(Continued)

*Primary Examiner* — Thomas M Lithgow
(74) *Attorney, Agent, or Firm* — Robert P. Michal, Esq.; Carter, DeLuca, Farrell & Schmidt, LLP (57) ABSTRACT

A drive module which is a self-supporting structure being transferable and hoistable as an integral entity. The drive module includes a self-supporting framework having a shape of a rectangular parallelepiped. The self-supporting framework defines an inner space within the self-supporting framework. The drive module also includes at least two drive units. The drive units are supported to the self-supporting framework in the inner space of the self-supporting framework. The drive units are connectable to an external rotatable shaft for the rotation of the rotatable shaft located outside the drive module.

15 Claims, 5 Drawing Sheets

(51) Int. Cl.
*F16M 3/00* (2006.01)
*B03D 1/20* (2006.01)
*B03D 1/24* (2006.01)

(52) U.S. Cl.
CPC ............. *B03D 1/1487* (2013.01); *B03D 1/20* (2013.01); *F16M 3/00* (2013.01); *B03D 1/24* (2013.01)

(56) References Cited

FOREIGN PATENT DOCUMENTS

| EP | 156699 A1 | * | 10/1985 |
| FR | 2428472 A3 | | 1/1980 |
| JP | H0870623 A | | 3/1996 |

OTHER PUBLICATIONS

Written Opinion of the International Searching Authority issued by the Finnish Patent and Registration Office acting as the International Searching Authority in relation to International Patent Application No. PCT/FI2015/050325 dated Sep. 4, 2015 (6 pages).

International Preliminary Report on Patentability issued by the Finnish Patent and Registration Office acting as International Preliminary Examining Authority in relation to International Patent Application No. PCT/FI2015/050325 date of completion Nov. 5, 2015 (6 pages).

* cited by examiner

DRIVE MODULE AND ITS USES, A
FLOTATION PLANT AND A METHOD OF
CHANGING OF THE DRIVE MODULE

CROSS-REFERENCE TO RELATED
APPLICATIONS

This application is a National Phase Entry under 35 USC § 371 of PCT Patent Application Serial No. PCT/FI2015/050325 filed May 13, 2015, the disclosure of this application is expressly incorporated herein by reference in its entirety.

FIELD OF THE INVENTION

The present invention relates to a drive module. Further, the invention relates to uses of the drive module. Further, the invention relates to a flotation plant. Further, the invention relates to a method of changing of the drive module.

SUMMARY OF THE INVENTION

According to a first aspect, the present invention provides a drive module. The drive module is a self-supporting structure being transferable and hoistable as an integral entity. The drive module comprises a self-supporting framework having a shape of a rectangular parallelepiped, the self-supporting framework defining an inner space within the self-supporting framework. Further, the drive module comprises at least two drive units. The drive units are supported to the self-supporting framework in the inner space of the self-supporting framework. The drive units are connectable to an external rotatable shaft for the rotation thereof. The rotatable shaft is located outside the drive module.

The technical effect of the invention is that the drive module being a self-supporting unit can be transferred and hoisted as an integral entity. The drive module can be assembled and furnished at the site of manufacture, e.g. in an engineering workshop, and then transported to the site of installation as one integral entity. During transportation, hoisting and use the drive units and all the other necessary equipment furnished into the drive module are well protected inside the self-supporting framework which acts as a delivery package and thereby eliminates need for separate transportation packages for the drive units and other furnishings. At the site of use the drive module may be placed on top of the flotation tanks. When the tanks need maintenance, the drive module together with its drive units can be lifted off and transferred aside to enable access to the tanks. Also for the maintenance of the equipment furnished inside the rive module, if needed, the drive module can be transferred as one entity to a site of maintenance.

In this application the following definitions apply regarding flotation. Flotation involves phenomena related to the relative buoyancy of objects. The term flotation includes all flotation techniques. Flotation can be for example froth flotation, dissolved air flotation (DAF) or induced gas flotation. Froth flotation is a process for separating hydrophobic materials from hydrophilic materials by adding gas, for example air, to process. Froth flotation could be made based on natural hydrophilic/hydrophobic difference or based on hydrophilic/hydrophobic differences made by addition of a surfactant or collector chemical. Gas can be added to the feedstock subject of flotation (slurry or pulp) by a number of different ways. In one embodiment gas can be added to the stream of feedstock subject to flotation before it is fed to the flotation tank. In one embodiment gas can be added to feedstock subject to flotation in the flotation tank. In one embodiment gas adding equipment can include gas dispersing equipment at the bottom of the tank. In one embodiment gas adding equipment can include a feedstock (slurry or pulp) jet for jetting the feedstock to air. In one embodiment gas adding equipment includes a rotor inside the tank. In one embodiment gas can be added under the rotor. In one embodiment gas is added by a pipe ending under rotor. The pipe can be inside the flotation tank. The pipe can go through the bottom of the flotation tank. In one embodiment the rotor takes gas from the surface of sludge by vortex. In one embodiment gas is added by axis of the rotor. In one embodiment mixing equipment is arranged for mixing the slurry/pulp. Mixing equipment could be for example a pump or a rotor. When the mixing is made by pump, the feedstock subject of flotation could be taken from one part of flotation tank and put back to another part of flotation tank. When mixing is made by the rotor, the rotor is inside the flotation tank. In one embodiment mixing equipment can include a rotor inside the flotation tank. In one embodiment mixing equipment can include a stator inside the flotation tank. The stator is for boosting mixing and to diffuse air to the feedstock (slurry or pulp) subject to flotation.

In one embodiment of the drive module, the drive unit comprises a motor.

In one embodiment of the drive module, the drive unit comprises a reduction gear connected to the motor.

In one embodiment of the drive module, the motor comprises an output shaft.

In one embodiment of the drive module, the output shaft is connected to the reduction gear.

In one embodiment of the drive module, the drive unit comprises a drive shaft, the drive shaft being connectable to the reduction gear and the drive shaft is connectable to the external rotatable rotor shaft.

In one embodiment of the drive module, the drive module comprises a frame. The frame is fixed to the self-supporting framework and configured to support the motor, the reduction gear unit and the drive shaft.

In one embodiment of the drive module, the drive module comprises a gas feed pipeline for supplying flotation gas. The technical effect of the gas feed pipeline being inside the module is that this provides for easy maintenance.

In one embodiment of the drive module, the drive module comprises connecting elements for connecting the gas feed pipeline. The technical effect is that the drive module can quickly be connected and disconnected.

In one embodiment of the drive module, the gas feed pipeline is located in the inner space of the self-supporting framework above and offset in relation to the drive units. The technical effect is that this location of the gas feed pipeline does not hinder installing and removing the drive units to and from the framework by hoisting in a vertical direction as they can go past the gas feed pipeline.

In one embodiment of the drive module, the gas feed pipeline is connectable in fluid communication with the drive shaft and the external rotatable rotor shaft, the drive shaft and the rotor shaft being hollow for conducting the flotation gas.

In one embodiment of the drive module, the drive module comprises a flow meter connected to the gas feed pipeline for measuring the rate of flow of the flotation gas. The technical effect is that the flow meter disposed in the inner space of the framework of the drive module is well protected.

In one embodiment of the drive module, the drive module comprises a flow rate controller connected to the gas feed pipeline for regulating the rate of flow of the flotation gas. The technical effect is that the flow rate controller disposed in the inner space of the framework of the drive module is well protected.

In one embodiment of the drive module, the drive module comprises measurement equipment for the measurement of liquid level in a flotation tank, when in use. The technical effect is that the measurement equipment disposed in the inner space of the framework of the drive module is well protected.

In one embodiment of the drive module, the drive module comprises a froth camera for detecting bubble size of froth, when in use. The technical effect is that the froth camera disposed in the inner space of the framework of the drive module is well protected.

In one embodiment of the drive module, the self-supporting framework comprises a maintenance platform.

In one embodiment of the drive module, the self-supporting framework comprises a cable tray for supporting electric cabling. The technical effect is that the electric cabling disposed in the inner space of the framework of the drive module is well protected.

In one embodiment of the drive module, the cable tray is located in the inner space of the self-supporting framework above and offset in relation to the drive units. The technical effect is that this location of the cable tray enables installing and removing the drive units to and from the framework by hoisting in a vertical direction past the cable tray.

In one embodiment of the drive module, the self-supporting framework is made of metal beams welded together to form a rectangular parallelepiped. The technical effect is that it gives a firm protective housing for the equipment installed inside the drive module.

In one embodiment of the drive module, the metal beams are welded together to form a rectangular parallelepiped.

In one embodiment of the drive module, the self-supporting framework has a shape of a rectangular parallelepiped box and comprises a floor, two side walls, and two end walls defining the inner space.

In one embodiment of the drive module, the drive module comprises 2 to 6, preferably 2 to 4, drive units. The technical effect is that this enables maintenance as convenient units that can easily be hoisted away by a crane.

According to a second aspect of the invention, the invention provides a flotation plant comprising a drive module according to the first aspect of the invention.

According to a second aspect of the invention, the invention provides use of the drive module according to the first aspect for separating material by flotation based on differences of buoyancy properties of substances. For example there is buoyancy difference when organic material is separated from aqueous material.

According to a third aspect of the invention, the invention provides use of the drive module according to the first aspect for separating solid material by froth flotation based on differences of hydrophilic properties of substances. Solid materials separated by froth flotation could be oil sands, carbon, coal, talk, industrial minerals and mineral particles. The minerals may include industrial minerals and ore. Froth flotation to solid material could be made based on natural hydrophilic/hydrophobic difference or based on hydrophilic/hydrophobic differences made by addition of a surfactant or collector chemical or other chemical.

According to a fourth aspect of the invention, the invention provides use of the drive module according to the first aspect for concentrating ore by froth flotation. An ore is a type of rock that contains sufficient minerals with important elements including metals that can be economically extracted from the rock. Metal ores are generally oxides, sulfides, silicates, or metals such as native copper or gold. Froth flotation of ore could be made based on natural hydrophilic/hydrophobic difference or based on hydrophilic/hydrophobic differences made by addition of a surfactant or collector chemical or other chemical.

According to a fifth aspect of the invention, the invention provides use of the drive module according to the first aspect for flotation of substances containing abrasive material. The abrasive mineral may be, for example, pyrite, silica, chromite. The drive module being hoistable and transferable as one unit to gain access to the tanks enables that the tanks can easily be maintained or replaced when they are outworn and are at the end of their life. This is important especially with the use in connection with abrasive material. Use of the flotation plant which is easy to maintenance is effective when flotation is made to abrasive material.

According to a sixth aspect of the invention, the invention provides use of the drive module according to the first aspect for for froth flotation of ore containing pyrite, silica, chromite. Use of the tanks made from PE or PP in connection with the drive module of the invention is effective when flotation is made to ore containing pyrite, silica, chromite. PE and PP are durable against the ore containing pyrite, silica, chromite.

The embodiments of the invention described hereinbefore may be used in any combination with each other. Several of the embodiments may be combined together to form a further embodiment of the invention. An apparatus, a method, a composition or a use, to which the invention is related, may comprise at least one of the embodiments of the invention described hereinbefore.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
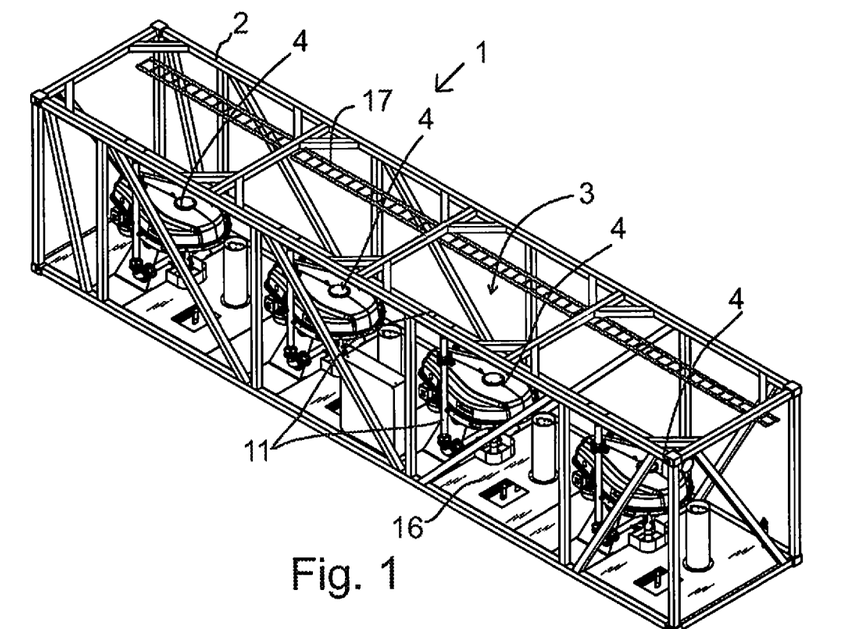
FIGS. 1 and 2 are axonometric views of the drive module according to one embodiment of the invention, the drive module being seen obliquely from above.
Figure 2:
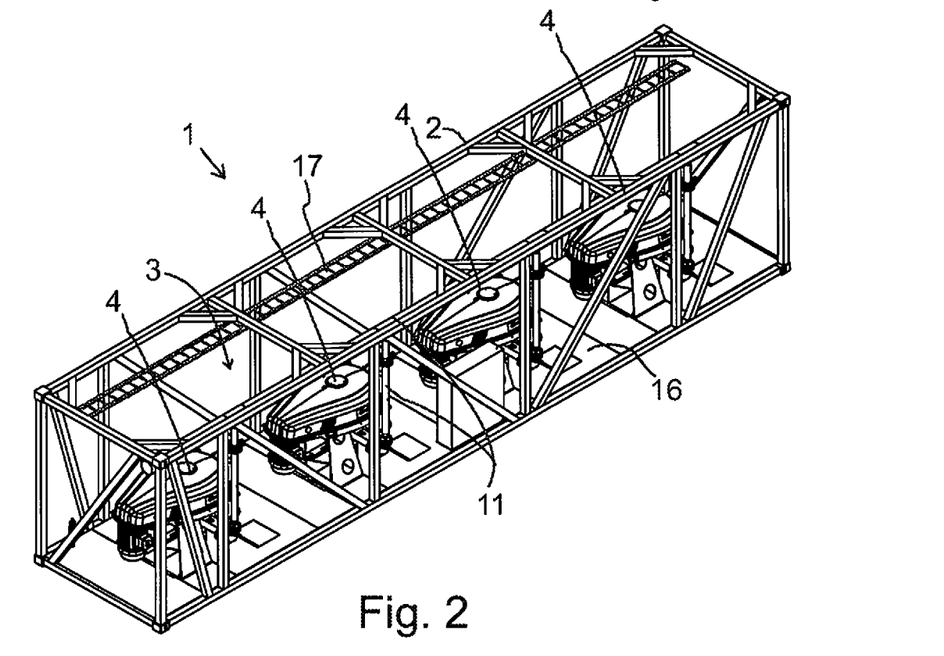
Figure 3:
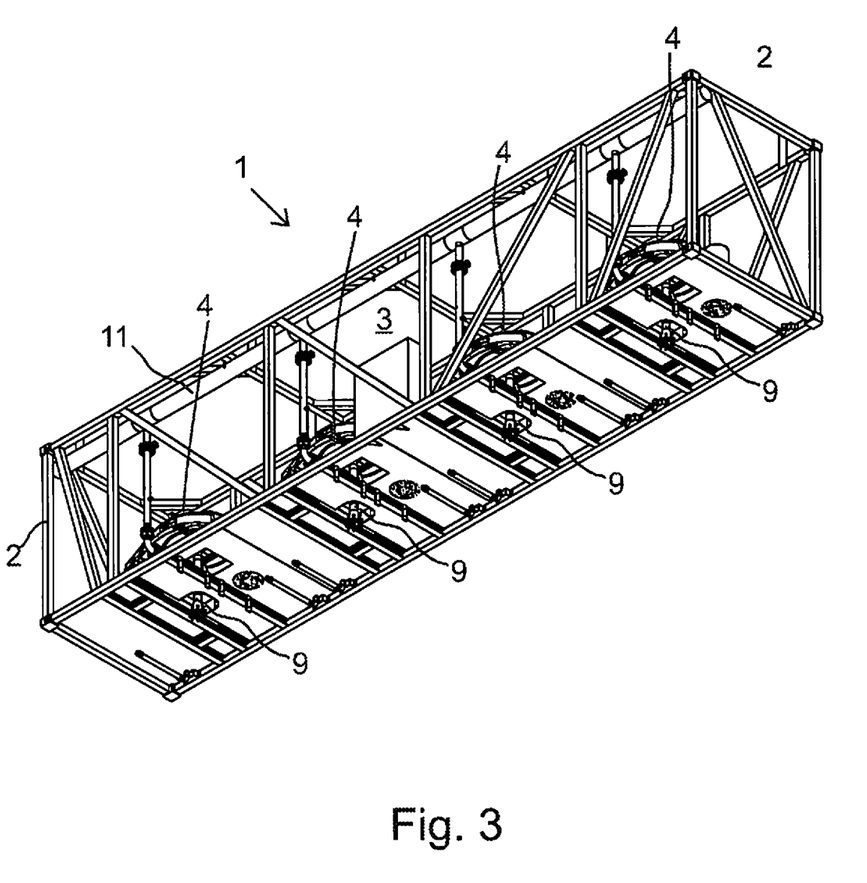
FIG. 3 shows the drive module of FIGS. 1 and 2 seen obliquely from underneath.

FIGS. 1 to 3 show a drive module 1.

The drive module 1 is usable in connection with a group tanks wherein mixing, flotation or similar operations are implemented and wherein there are rotors or impellers attached to external rotatable shafts which when being connected to the drive units 4 contained in the drive module 1 can be rotated by the drive units 4.

It should be noted that the principles according to the invention can be implemented regardless of the specific type of the flotation, i.e. the flotation technique can be any of the known per se flotation techniques, such as froth flotation, dissolved air flotation or induced gas flotation.

The drive module 1 is a self-supporting structure which can be transferred and hoisted as an integral entity. The drive module 1 comprises a self-supporting framework 2 having a shape of a rectangular parallelepiped.

The self-supporting framework 2 is made of metal beams which welded together to form a space frame structure with a shape of the rectangular parallelepiped. The self-supporting framework 2 defines an inner space 3 within the self-supporting framework. Further, the drive module 1 comprises four drive units 4. The number of drive units 4 can be e.g. two to six, preferably two to four, depending on the number of external rotatable shafts to which the drive units 4 are supposed to be connected.

The drive units 4 are supported to the self-supporting framework 2 in the inner space 3 of the self-supporting framework 2.

Figure 5:
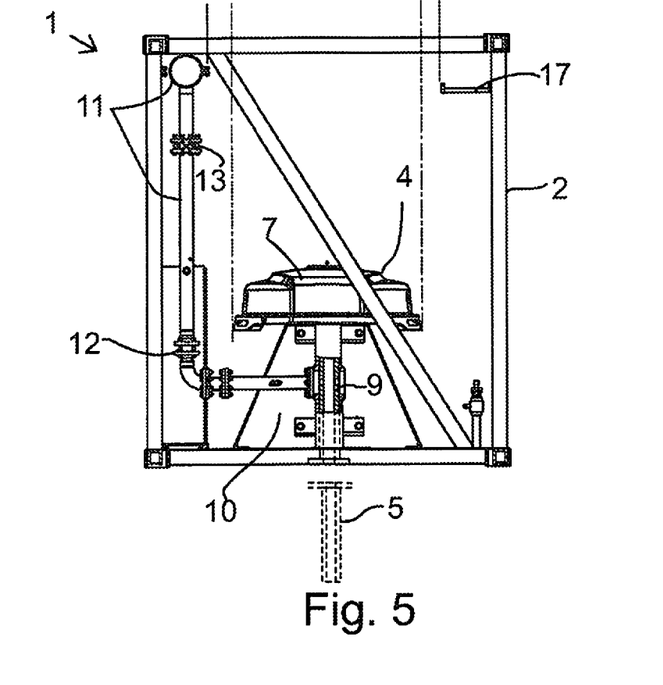
FIG. 5 is a cross-section V-V from FIG. 4.
Figure 6:
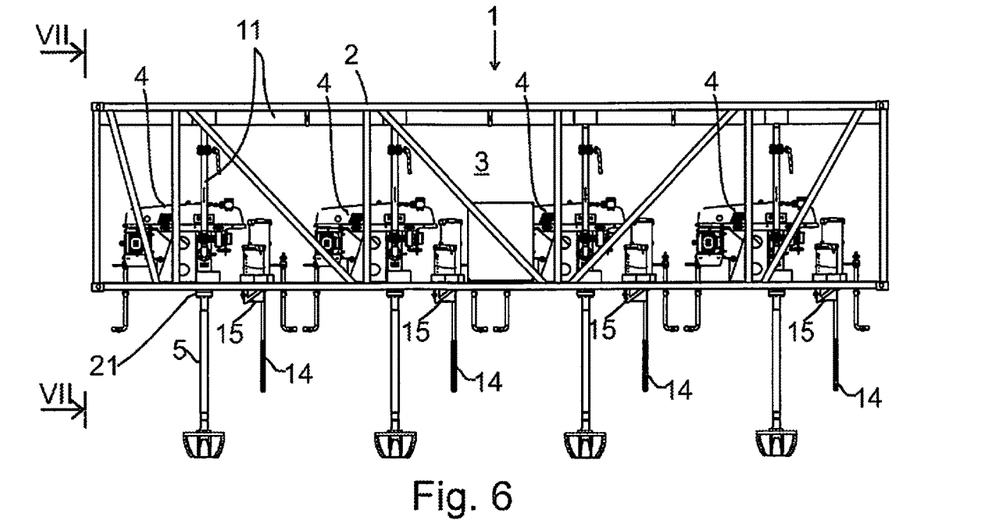
FIG. 6 is a side view of the drive module with additional furnishings and external rotatable shafts being attached to the drive units.
Figure 7:
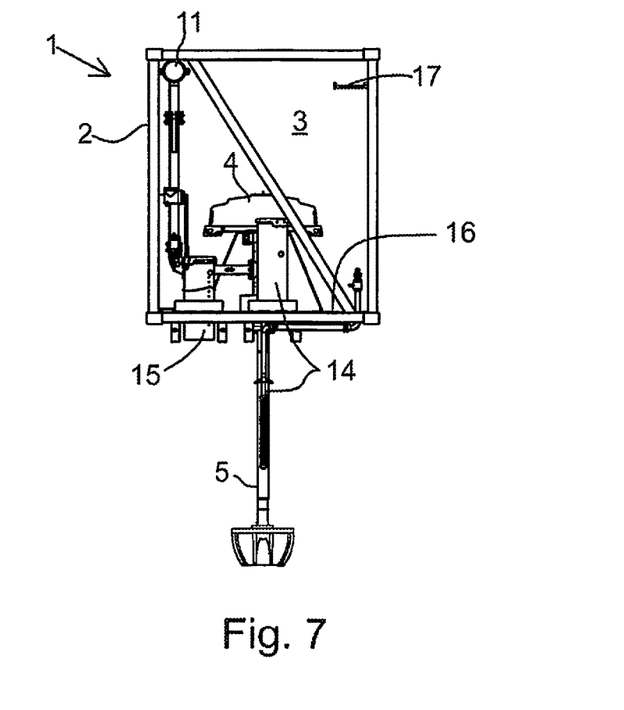
FIG. 7 is a view VII-VII of the drive module of FIG. 6.

As can be seen in FIGS. 5 to 7, the drive units 4 are connectable to an external rotatable shaft 5 for the rotation of the rotatable shaft 5. The rotatable shaft 5 is located outside the drive module 1.

A preferable embodiment of the drive module 1 and its self-supporting framework 2 is that they are compatible to intermodal freight container standards whereby they have dimensions and corner fittings which enable intermodal transportability.

Figure 4:
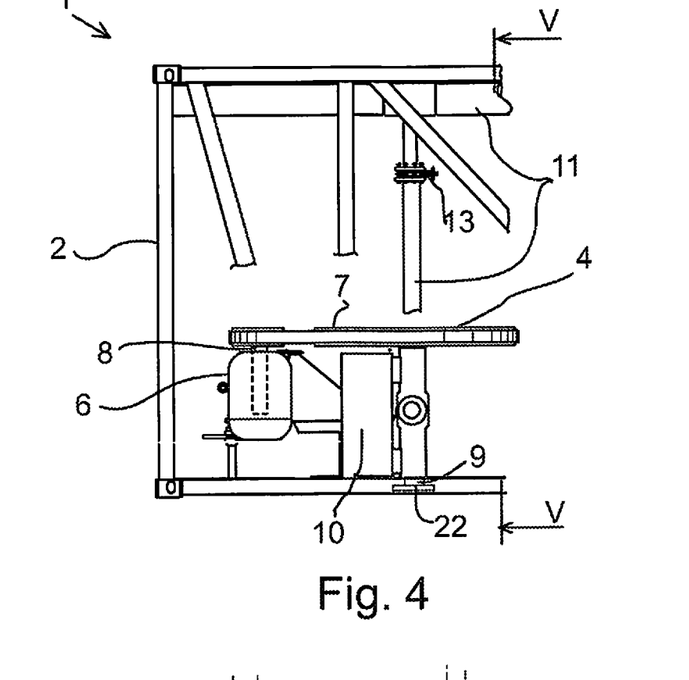
FIG. 4 is a schematic illustration showing one of the drive units of the drive module of FIGS. 1 to 3.

As illustrated in FIG. 4, the drive unit 4 comprises a motor 6 and a reduction gear 7 connected to the motor 6. The motor 6 comprises an output shaft 8. The output shaft 8 is connected to the reduction gear 7. The drive unit 4 comprises a drive shaft 9. The drive shaft 9 is connected to the reduction gear 7 and the drive shaft is connectable to the external rotatable rotor shaft 5 e.g. by a bolted flange joint 21 (see FIG. 6). For this purpose the lower end of the drive shaft 9 has a connection flange 22 (see FIG. 4).

Referring to FIG. 4, the drive module 1 comprises a frame 10. The frame 10 is fixed to a bottom of self-supporting framework 2 and configured to support the motor 6, the reduction gear unit 7 and the drive shaft 9.

As can be seen in FIGS. 1 to 5, the drive module 1 comprises a gas feed pipeline 11 for supplying flotation gas and a cable tray 17 for supporting electric cabling. The gas feed pipeline 11 and the cable tray 17 extend along the length of the drive module 1.

Especially FIG. 5 shows that the gas feed pipeline 11 and the cable tray 17 are located in the inner space 3 of the self-supporting framework 2 so that they are above the level in relation to the level of the drive units 4. Also they are offset in relation to the drive units 4 so that they do not hinder or interfere hoisting of the drive unit 4 in an upwards direction. During installing and removing the drive units 4 pass by the gas feed pipeline 11 and the cable tray 17.

As shown in FIG. 5, the gas feed pipeline 11 is connected in fluid communication with the drive shaft 9 and the external rotatable rotor shaft 5. Both the drive shaft 9 and the rotor shaft 5 are hollow and thus are able to conduct the flotation gas.

The drive module 1 further comprises a flow meter 12 which is connected to the gas feed pipeline 11 for measuring the rate of flow of the flotation gas. A flow rate controller 13 is connected to the gas feed pipeline 11 for regulating the rate of flow of the flotation gas.

In FIGS. 6 and 7 some additional equipment connectable to the drive module 1 is shown. The drive module 1 may also comprise a measurement equipment 14 for the measurement of liquid level in a flotation tank (not shown), when in use in froth flotation. The drive module 1 may also comprise a froth camera 15 for detecting bubble size of froth, when in use in froth flotation. Preferably, the self-supporting framework 2 also comprise a maintenance platform 16 (see also FIG. 1) that enables easy access to the inner space 3 of the self-supporting framework 2 for e.g. maintenance of the various equipment contained in the drive module.

The drive module 1 may also be equipped with a variety of other equipment that can be installed already at the manufacturing site. When needed, the drive module 1 may contain e.g.

- a water pipeline for supplying water to an overflow receptacle which receives the overflow from the froth flotation tank,
- a gas suction pipeline for recirculating the flotation gas (needed for work safety reasons e.g. in froth flotation of molybdenum wherein the flotation gas is poisonous),
- a roofing on top of the drive module, and shields that cover the sides of the self-supporting space frame metal beam framework for shielding the equipment furnished inside the framework from harsh environmental conditions (sunshine, rain, sandstorm, ice, snow etc.).

Figure 8:
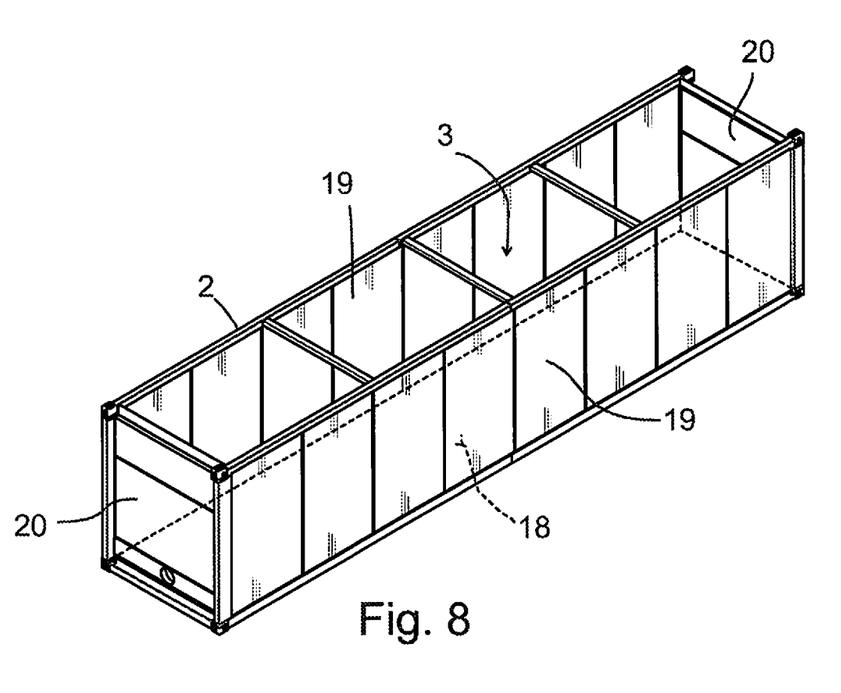
FIG. 8 shows a further embodiment of the self-supporting framework of the drive module according to the invention.

Reference is made to FIG. 8. As an alternative to the metal beam structure of the self-supporting framework 2 that is shown in FIGS. 1 to 7, the self-supporting framework 2 may also have a shape of a rectangular parallelepiped box that comprises a floor 18, two side walls 19, and two end walls 20 defining the inner space 3, as is shown in FIG. 8.

A flotation plant may comprise a drive module as described.

If the drive module needs maintenance and cannot be maintained at its installation place, it can be can be lifted off as one entity and replaced by another drive module.

If the tanks underneath the drive module need maintenance, then the drive module can be lifted off from the top of the tanks to gain access to the tanks.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A drive module selectively detachable from flotation tanks of a flotation plant, wherein the drive module is a self-supporting structure being transferable and hoistable as an integral entity, the drive module comprising:
    a self-supporting framework having a shape of a rectangular parallelepiped, the self-supporting framework defining an inner space within the self-supporting framework, and
    at least two drive units, the at least two drive units being supported to the self-supporting framework in the inner space of the self-supporting framework, each of the at least two drive units including a drive shaft having a connection flange supported thereon, wherein the connection flange of each of the at least two drive units is located at the bottom of the inner space and is connectable to an external rotatable shaft for the rotation of the rotatable shaft, the rotatable shaft being located outside the drive module.

2. The drive module according to claim 1, wherein the drive unit comprises:
    a motor; and a reduction gear connected to the motor, the motor comprising an output shaft, the output shaft being connected to the reduction gear, and that the drive unit comprises a drive shaft, the drive shaft being connectable to the reduction gear and the drive shaft is connectable to the external rotatable rotor shaft.

3. The drive module according to claim 2, wherein the drive module comprises:
   a frame, the frame being fixed to the self-supporting framework and configured to support the motor, the reduction gear unit and the drive shaft.

4. The drive module according to claim 1, wherein the drive module comprises:
   a gas feed pipeline for supplying flotation gas.

5. The drive module according to claim 4, wherein the gas feed pipeline is located in the inner space of the self-supporting framework above and offset in relation to the drive units.

6. The drive module according to claim 4, wherein the drive module comprises:
   a flow meter connected to the gas feed pipeline for measuring the rate of flow of the flotation gas.

7. The drive module according to claim 4, wherein the drive module comprises:
   a flow rate controller connected to the gas feed pipeline for regulating the rate of flow of the flotation gas.

8. The drive module according to claim 1, wherein the drive module comprises:
   measurement equipment for the measurement of liquid level in a flotation tank, when in use.

9. The drive module according to claim 1, wherein the drive module comprises:
   a froth camera for detecting bubble size of a froth, when in use.

10. The drive module according to claim 1, wherein the self-supporting framework comprises a maintenance platform.

11. The drive module according to claim 1, wherein the self-supporting framework comprises a cable tray for supporting electric cabling.

12. The drive module according to claim 1, wherein the self-supporting framework is made of metal beams to form a rectangular parallelepiped.

13. The drive module according to claim 1, wherein the drive module comprises 2 to 6, preferably 2 to 4, drive units.

14. A flotation plant comprising a drive module according to claim 1.

15. A method of operating the drive module, comprising:
providing a drive module according to claim 1; and
separating material by flotation based on differences of buoyancy properties of substances, or
separating solid material by froth flotation based on differences of hydrophilic properties of substances, or
concentrating ore by froth flotation, or
flotation of substances containing abrasive material, or
froth flotation of ore containing pyrite, silica, or chromite.

* * * * *